United States Patent Office

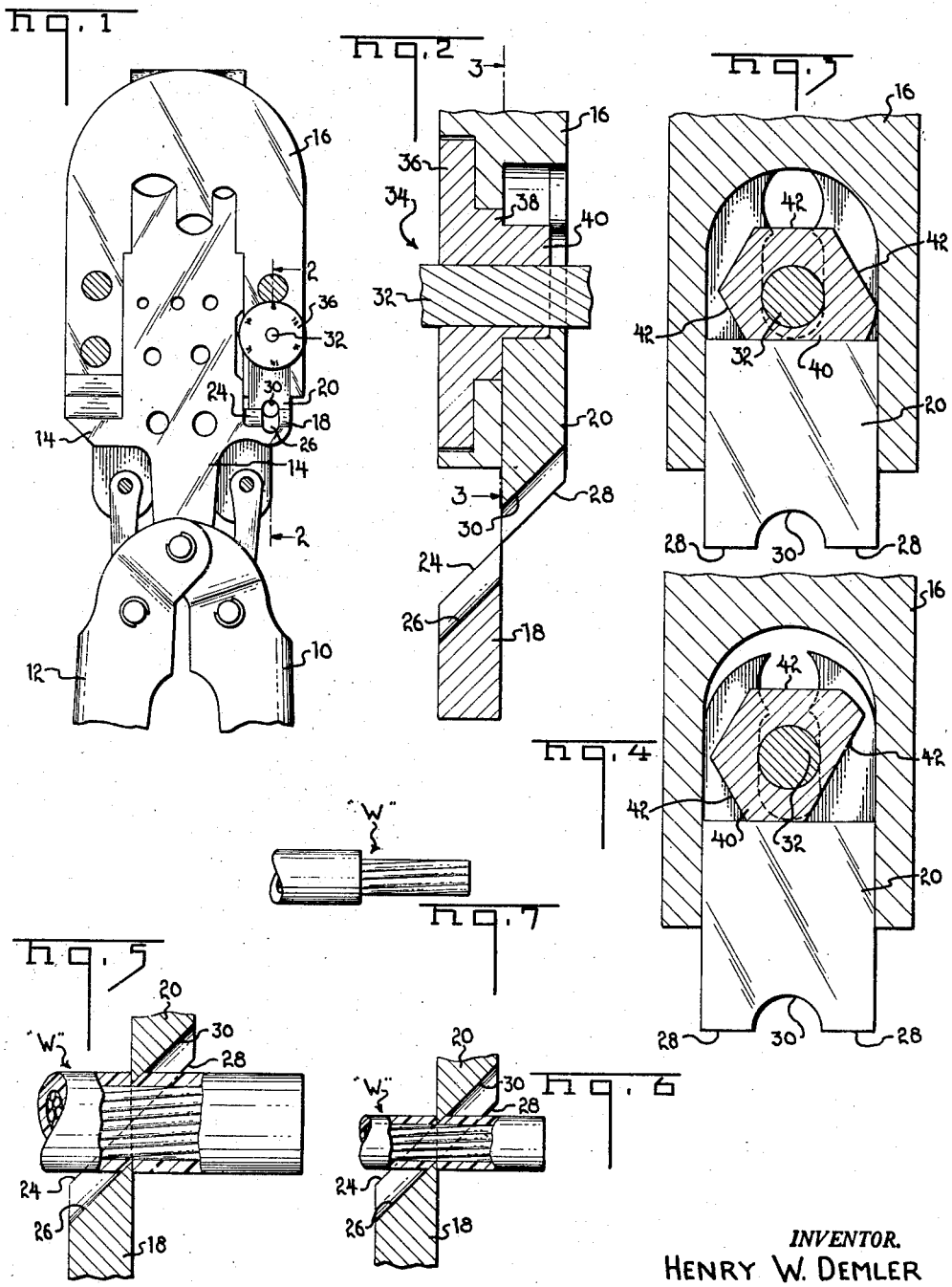

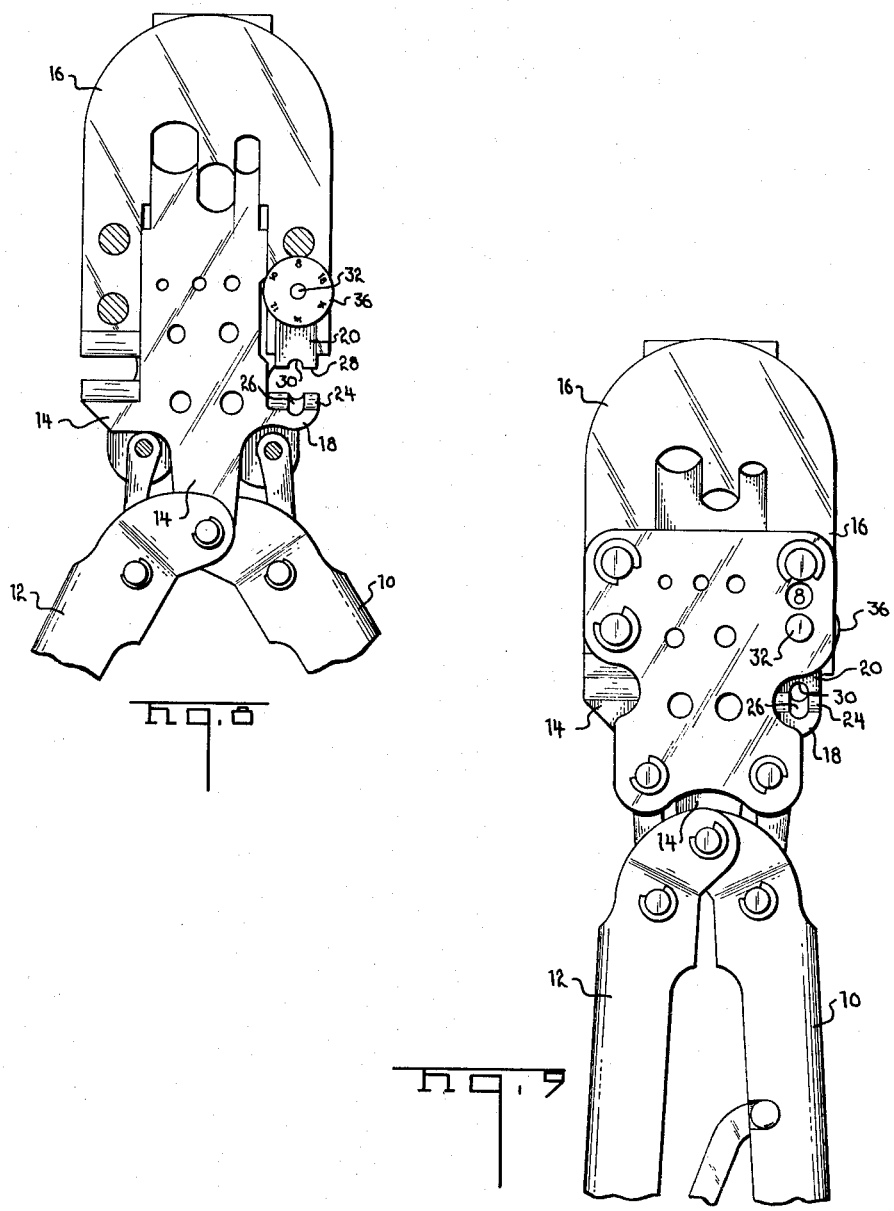

3,191,464
Patented June 29, 1965

3,191,464
ADJUSTABLE WIRE STRIPPING DEVICE
Henry W. Demler, Lebanon, Pa., assignor to
AMP Incorporated, Harrisburg, Pa.
Continuation of abandoned application Ser. No. 13,956,
Mar. 9, 1960. This application Oct. 23, 1963, Ser. No.
318,451
2 Claims. (Cl. 81—9.5)

This application is a continuation of my application Serial No. 13,956 filed March 9, 1960, entitled "Adjustable Wire Stripping Device," now abandoned.

In the use of insulated electrical wire, it is the usual practice to remove a length of insulation from each end of the wire so that the exposed end of the wire may be properly terminated. It is an object of this invention to provide such a device for stripping insulated wire whereby the blades of the stripping device may be easily adjusted to accommodate various sizes of wire. It is also an object of this invention to provide such a wire stripping device which may be easily adjusted to strip a large range of wire sizes.

Other objects and attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purposes of illustration in order that others skilled in the art may fully understand the invention and the principles thereof and the manner of applying it in practical use so that they may modify it in various forms, each as may be best suited to the conditions of a particular use.

In the drawings:

FIGURE 1 illustrates a wire stripping device embodying the principles of this invention;

FIGURE 2 is a sectional view taken along plane 2—2 of FIGURE 1;

FIGURE 3 is a fragmentary sectional view taken along plane 3—3 of FIGURE 2;

FIGURE 4 is a view similar to FIGURE 3 illustrating the wire stripping adjusting means in a different position;

FIGURES 5 and 6 are fragmentary views of the blades of the wire stripper shearing a length of insulation on a wire;

FIGURE 7 illustrates a length of insulated wire with a section of insulation removed from one end thereof;

FIGURE 8 is a view similar to FIGURE 1 illustrating the device in open position; and FIGURE 9 is a view similar to FIGURE 1 showing the exposed front of the tool.

As shown in the drawings (FIGURE 1), the tool embodying the wire stripping device described in this invention comprises a pair of handles 10 and 12 which are pivoted by a toggle linkage to a driving member 14 and a U-shaped fixed member 16. The driving member 14 carries one blade of the insulation stripping member 18 and the other blade 20 is secured to the fixed member 16. It is noted that the blades are in face-to-face planar relationship so that the leading edges are in sliding contact.

The member 14 is longitudinally slidable with relation to the member 16, via actuation of the handles 10 and 12. The blade 20, fixed to the member 16, is adjustable and the proximity of the blade 18 to the blade 20 at the end of the stroke determines the depth of the cut in stripping the wire. The blade 20 may be adjusted to the innermost position to strip fine wire whereby it is closest to the blade 18 at the end of travel. To strip thicker wire (having larger outside diameter), the adjustable blade 20 is moved upwardly so that there is a greater distance between the two blades at the end of the stroke. The setting of the blades depends upon the thickness of the insulation.

The movable blade 18 has a beveled surface 24 with an arcuate slot 26 located intermediately thereof. The slot 26 is beveled in the same direction as the surface 24 and is adapted to sever the insulation on the wire. The other blade 20 has a similar beveled surface 28 and a corresponding beveled cutting slot 30. The slots 26 and 30 are aligned and adapted to embrace the metal core of the conductor during the stripping process without cutting or nicking the strands.

The adjustable blade 20, has a plate member 21 with a slot therein. The blade is secured to the frame by means of a pivot pin 32 which forms a lost motion connection with slot in the plate 21 and is seated in a bearing member 34. This bearing 34 has three stepped portions of decreasing diameter, 36, 38 and 40. The stepped portion 36 contains a disk with markings on the outer face corresponding to wire sizes so that the operator will be able to determine proper positioning of the adjustable blade 20. The central stepped portion 38 is rotatable within the frame 16. The smallest stepped portion 40 contains a number of flat surfaces 42, each located a different distance from the center to form an eccentric. As shown in FIGURES 3 and 4, the distance from each flat surface to the center of the pivot pin determines the position of the movable blade 20 relative to the blade 18.

When it is desired to sever the insulation from the end of an insulated conductor, the dial member 36 is set at the proper adjustment for the size of the wire. The handles of the tool are apart and the blades 18 and 20 are separated. The insulated conductor is inserted between the blades so that it is aligned with the arcuate slots 26 and 30. The handles of the tool, 10 and 12, are closed so that the beveled arcuate slots 26 and 30 are driven toward each other and cut the insulation on the conductor. The stranded portion of the conductor is located within the arcuate slots 26 and 30, and is thus not affected by the cutting edges. When the blades 18 and 20 are driven together in their final position, the operator pulls on the wire in a direction laterally to the tool. This causes the section of severed insulation to be slipped off the end of the wire, and the wire is prepared for connection into an electrical circuit.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

I claim:

1. In a tool for stripping insulation from a conductor including a frame member having a recess at one end, an insulation cutting blade fitted in the said recess for sliding movement axially of said frame member and supported within said frame member, means for adjusting said blade axially of said recess including an eccentric bearing member in said recess affixed to said frame for rotary movement, the said bearing member having surfaces of different radii and adapted to engage said blade and position such at different points in said recess, a driven member adapted to engage portions of said frame member for axial sliding movement within said frame member, a further insulation cutting blade fixedly mounted on said driven member in face-to-face relationship with said first mentioned blade and adapted to cooperate with said first mentioned blade to cut insulation on a conductive lead, means for actuating said driven member axially in relative movement to said frame member to effect closure of said blades to accomplish insulation stripping.

2. In a tool for stripping insulation from conductive leads the combination comprising a first rigid plate member having a U-shaped configuration, a second rigid plate member having a body portion adapted to fit within the U-shaped configuration of said first plate member to be slidingly supported thereby and a further portion extending outwardly from said body portion in line with an end of said first plate member, said further portion carrying an insulation cutting blade disposed in a plane parallel to the said first and second plate members, means for driving said second plate member within said first plate member and holding said first plate member fixed relative to the second plate member movement, the said first plate member having a recess extending from the said end in line with said further portion and first mentioned cutting blade, a further insulation cutting blade carried by said recess and shaped to fit therein and be supported for sliding movement to different positions relative to said first mentioned cutting blade, and means including an eccentric supported by said first plate member for rotary movement within said recess to engage a portion of said further cutting blade to set the further blade to different positions relative to said first mentioned cutting blade whereby to accommodate different size insulated conductors.

References Cited by the Examiner
UNITED STATES PATENTS

| | | |
|---|---|---|
| 893,132 | 7/08 | Bork. |
| 924,357 | 6/09 | Irwin. |
| 1,107,210 | 8/14 | Adams. |
| 1,475,273 | 11/23 | Bernard. |
| 2,765,688 | 10/56 | Evans _____ 81—341 X |
| 2,800,042 | 7/57 | Demler. |

WILLIAM FELDMAN, *Primary Examiner.*

MILTON S. MEHR, *Examiner.*